United States Patent [19]

Joo et al.

[11] Patent Number: 4,826,701

[45] Date of Patent: May 2, 1989

[54] PROCESS FOR PRODUCING PACKAGED ASEPTIC SOYBEAN CURD

[75] Inventors: Kasuhiro Joo; Yoshinao Ogasa, both of Tokushima, Japan

[73] Assignee: Shikoku Kakooki Co., Ltd., Tokushima, Japan

[21] Appl. No.: 157,174

[22] Filed: Feb. 11, 1988

Related U.S. Application Data

[63] Continuation of Ser. No. 828,815, Feb. 12, 1986, abandoned.

[30] Foreign Application Priority Data

Feb. 14, 1985 [JP] Japan ................................. 60-28067

[51] Int. Cl.$^4$ ........................... A23J 3/00; A23L 1/20
[52] U.S. Cl. .................................. 426/573; 426/634; 426/401
[58] Field of Search ............... 426/401, 634, 656, 399, 426/412, 407, 521, 573

[56] References Cited

U.S. PATENT DOCUMENTS

| | | | |
|---|---|---|---|
| 4,000,326 | 12/1976 | Okada et al. | 426/412 |
| 4,140,811 | 2/1979 | Ogasa et al. | 426/656 |
| 4,514,433 | 4/1985 | Matsuura | 426/634 |

*Primary Examiner*—Marianne Cintins
*Attorney, Agent, or Firm*—Armstrong, Nikaido, Marmelstein & Kubovcik

[57] ABSTRACT

A packaged aseptic soybean curd is produced by sterilizing a soybean milk and bittern separately by heating, and by cooling the sterilized soybean milk and bittern separately to below the coagulation temperature of the soybean milk. The cooled soybean milk is passed to a filling device through a main conduit, and the cooled bittern is passed through a subconduit to the main conduit at a position close to the filling device. The bittern and the soybean milk are mixed with the main conduit immediately before being passed to an aseptic chamber where the mixture is placed in a container made of a material which serves a barrier to gases. The filled container is closed with a closure which is also made of a material which serves as a barrier to gases and sealed in the same. The sealed container is then heated to coagulate the mixture therein and obtain a soybean curd.

6 Claims, 1 Drawing Sheet

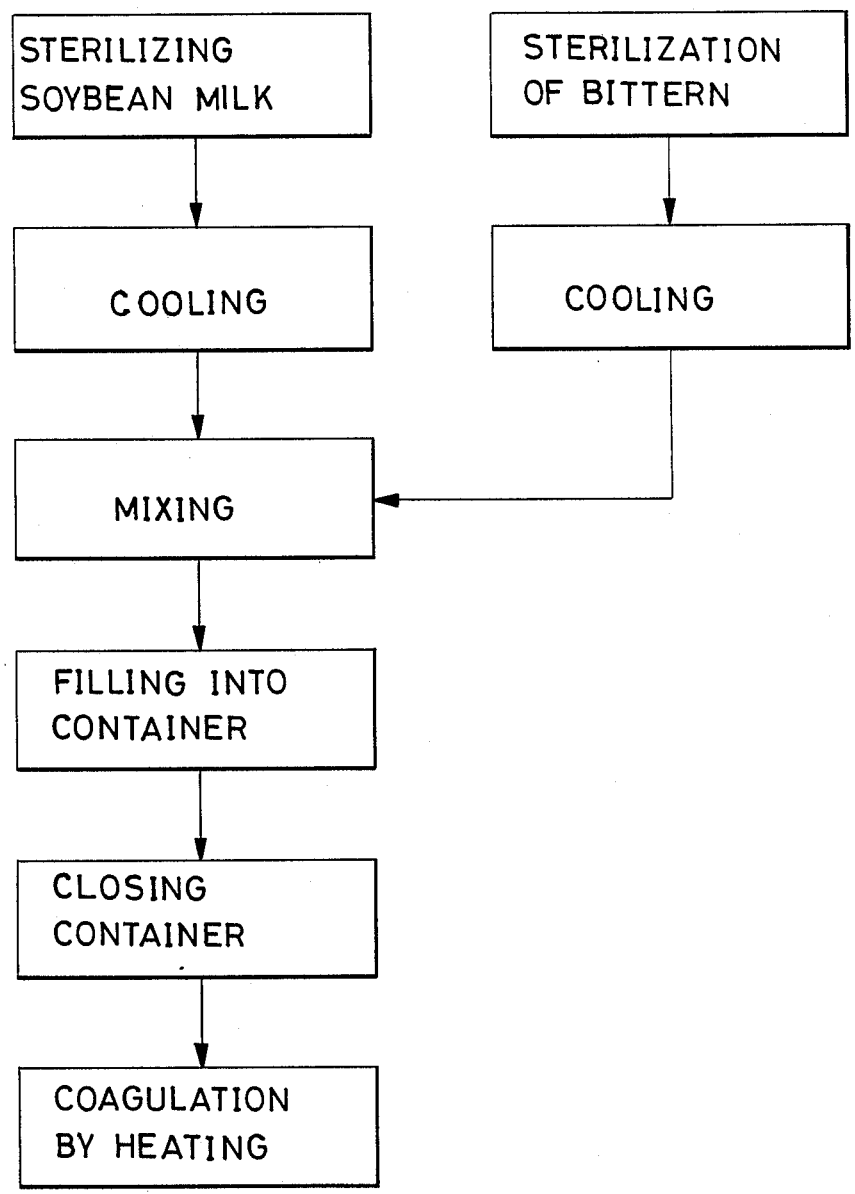

PROCESS FOR PRODUCING PACKAGED ASEPTIC SOYBEAN CURD

This is a continuation of application Ser. No. 828,815 filed Feb. 12, 1986, now abandoned.

BACKGROUND OF THE INVENTION

The present invention relates to a process for producing a packaged aseptic soybean curd, and more particularly to a process for automatically producing a packaged aseptic kinugoshi soybean curd.

U.S. Pat. No. 4,000,326 discloses a method of preparing a packaged aseptic soybean curd automatically. The disclosed method generally comprises sterilizing soybean milk by heating and thereafter cooling the milk to room temperature, mixing in an aseptic atmosphere the soybean milk with an aqueous solution of glucono-delta-lactone sterilized by being filtered with a millipore filter, filling the mixture into a container in an aseptic atmosphere and sealing the container, and immersing the sealed container in a hot water bath to coagulate the mixture.

The conventional soybean curd production method described above employs glucono-delta-lactone as a coagulant. However, glucono-delta-lactone has the drawback of being more expensive than bittern which has long been used as a coagulant and rendering soybean curd sour to impair the taste when used. The reason why glucono-delta-lactone is used as a coagulant as above in place of bittern only for producing soybean curd automatically is that bittern reacts with soybean milk immediately when merely mixed therewith, consequently making it impossible to fill the mixture into a container, whereas glucono-delta-lactone rapidly reacts with and coagulates soybean milk only when heated, such that the mixture can be filled into a container without coagulation before heating. Furthermore, glucono-delta-lactone, which can not be sterilized by heating, requires use of a millipore filter and can not be sterilized inexpensively.

Accordingly, it is desired to provide a process for automatically producing a packaged aseptic soybean curd of good taste with use of bittern which is an inexpensive coagulant and which can be sterilized by heating.

SUMMARY OF THE INVENTION

To meet the above demand, the present invention provide a process for producing a packaged aseptic soybean curd comprising the steps of sterilizing a soybean milk and bittern separately by heating, cooling the sterilized soybean milk and bittern separately to below the coagulation temperature of the soybean milk, supplying the cooled soybean milk to a filling device through a main conduit, supplying the cooled bittern through a subconduit to the main conduit at a position close to the filling device and mixing the bittern with the soybean milk within the main conduit immediately before filling, filling in an aseptic chamber the mixture of soybean milk and bittern into a container having gas barrier properties, closing the filled container with a closure having gas barrier properties and sealing the container in the same chamber, and heating the sealed container to coagulate the mixture therein and obtain a soybean curd.

With the process of the present invention for producing a packaged aseptic soybean curd, soybean milk is cooled to below the coagulation temperature thereof, and the bittern to be admixed with the milk is similarly cooled, so that when the two materials are mixed together, the milk will not immediately coagulate because of a low reaction velocity. Further since the two materials are mixed together within the main conduit immediately before filling, the mixture can be filled into a container before the coagulation of the soybean milk. Bittern used as a coagulant for automatically preparing the packaged aseptic soybean curd is less expensive than glucono-delta-lactone used for the conventional process, provides a tasty soybean curd and can be sterilized inexpensively by heating without using the millipore filter.

The mixture of soybean milk and bittern is filled into a container having gas barrier properties in the aseptic chamber, and the filled container is subsequently closed with a closure having gas barrier properties in the same chamber. The sealed container is then heated to coagulate the mixture therein, so that the soybean curd obtain can be preserved for a prolonged period of time.

The soybean milk to be used in the process of the invention preferably has a solids concentration of 10 to 13%. The means to be used for heating the soybean milk and bittern for sterilization and subsequently cooling them are heat exchangers. Both the materials are heated at a temperature of at least 128° C. for at least one second. Both the materials are cooled to a temperature of up to 20° C., preferably 15° to 17° C. After cooling, the soybean milk and the bittern are each temporarily stored in an aseptic tank. Preferably a pipe mixer is used for mixing the bittern with the soybean milk. The milk and the bittern are mixed together preferably in a ratio of 50:1 to 75:1, more preferably 60:1. As the bittern, it is desirable to use magnesium chloride having a purity of at least 95%, in the form of an aqueous magnesium chloride solution 20 to 25% in Brix. In order to prevent putrefaction of the soybean curd, the container and the closure should be made of a material having gas barrier properties, especially oxygen barrier properties. Examples of suitable materials are synthetic resins such as polypropylene and nylon. When desired, composite materials may be used. The sealed container is heated preferably at a temperature of at least 80° C. for at least 20 minutes, using steam or hot water. To prevent the soybean curd from degradation during preservation, it is desirable to rapidly cool the container after heating.

BRIEF DESCRIPTION OF THE DRAWING

The drawing is a block diagram showing the process of the inventiOn for producing a packaged aseptic soybean curd.

EXAMPLE

A soybean milk obtained by the usual method and having a solids concentration of 11% is passed through a deaeration tank first to remove air bubbles from the milk. The milk is then passed through a heating heat exchanger and then through a cooling heat exchanger and is stored in an aseptic tank. The milk is heated at 135° C. using steam as a heat medium. The time taken for the milk to pass through the heat exchanger is 2 seconds. The coolant used is cold water, and the milk is cooled to a temperature of 15.5° C.

Bittern is heated and cooled in the same manner and under the same conditions as above and then stored in an aseptic tank. As the bittern, magnesium chloride having a purity of 99.5% is used in the form of an aqueous magnesium chloride solution, 22% in Brix.

The sterilized soybean milk is fed from the tank to a filling device via a main conduit. The main conduit is internally provided with a pipe mixter at a position close to the falling device. A subconduit for the bittern is connected to the main conduit at the portion thereof having the pipe mixer. The bittern is supplied from the tank to the pipe mixer via the subconduit in an amount of 5 ml per 300 ml of the soybean milk, whereby the bittern is instantaneously mixed with the milk.

The filling device is mounted on the top wall of an aseptic chamber and has an injection opening equipped with a valve and extending downward into the chamber. A conveyor carrying a multiplicity of box-shaped containers thereon is adapted to travel immediately below the injection opening. The interior of the aseptic chamber including devices therein is first sterilized with a spray of hydrogen peroxide, the inside air is then replaced by hot air, and the air is thereafter cooled to room temperature. Thus, an aseptic atmosphere is maintained in the chamber. The mixture of milk and bittern is filled into each container under gravity. The time taken for the filling is 20 seconds. The filling time is controlled by opening and closing the valve. The container and the closure therefor are made of colorless transparent polypropylene. The filled container is mechanically closed with the closure and heat-sealed within the same chamber.

Each sealed container automatically sent out from the aseptic chamber is placed into a hot water bath and thereby heated at 96° C. for 30 minutes, whereby the mixture in the sealed container is coagulated into kinugoshi (fine-texture) soybean curd.

After heating, the sealed container is transferred from the hot bath to a cooling tank. Thus, a packaged soybean curd free of degradation is obtained.

What is claimed is:

1. A process for automatically producing a packaged aseptic kinugoshi soybean curd comprising the steps of separately heat sterilizing a soybean milk and a coagulant consisting essentially of magnesium chloride having a purity of at least 95%, cooling the sterilized soybean milk and coagulant separately to a temperature of up to 20° C., supplying the cooled soybean milk to a filling device through a main conduit, supplying the cooled coagulant through a subconduit to the main conduit at a position close to the filling device and mixing the coagulant with the soybean milk within the main conduit immediately before filling, filling in an aseptic chamber the mixture of soybean milk and coagulant into a container which is formed from a material which functions as a barrier to gases, closing the filled container with a closure which is formed from a material which functions as a barrier to gas and sealing the container in the aseptic chamber, and heating the sealed container to coagulate the mixture therein and obtain a soybean curd.

2. A process as defined in claim 1 wherein the soybean milk and bittern are heated for sterilization at a temperature of at least 128° C. for at least 1 second.

3. A process as defined in claim 1 wherein the soybean milk and the bittern are mixed together in a ratio of 50:1 to 75:1.

4. A process as defined in claim 1 wherein the bittern and the soybean milk are mixed together by a pipe mixer.

5. A process as defined in claim 1 wherein the sealed container is heated at a temperature of at least 80° C. for about 20 minutes.

6. A process as defined in claim 1 wherein:
the mixture from the main conduit is filled into containers by the filling device which is disposed on a top wall of the aseptic chamber and which comprises a valved injection opening facing downward into the aseptic chamber;
a conveyor carrying box-like containers is positioned to run beneath the opening so that the containers receive the soybean milk-bittern mixture by gravity; and
the filling time is controlled by opening or closing the valve.

* * * * *

UNITED STATES PATENT AND TRADEMARK OFFICE
CERTIFICATE OF CORRECTION

PATENT NO. : 4,826,701
DATED : May 2, 1989
INVENTOR(S) : JOO et al

It is certified that error appears in the above-identified patent and that said Letters Patent is hereby corrected as shown below:

On the cover page, Item [75], "Kasuhiro" should read --Katsuhiro--.

Signed and Sealed this

Thirtieth Day of January, 1990

*Attest:*

JEFFREY M. SAMUELS

*Attesting Officer*   *Acting Commissioner of Patents and Trademarks*